March 24, 1970 R. F. SHELBY 3,502,988

TUNING CIRCUIT INCLUDING A SIGNAL-CONTROLLED
VARIABLE CAPACITANCE DEVICE
Filed Sept. 8, 1966

INVENTOR.
RUFUS F. SHELBY

BY Leonard Zalman

ATTORNEY

United States Patent Office 3,502,988
Patented Mar. 24, 1970

1 2

3,502,988

TUNING CIRCUIT INCLUDING A SIGNAL-CONTROLLED VARIABLE CAPACITANCE DEVICE

Rufus F. Shelby, Philadelphia, Pa., assignor to Philco-Ford Corporation, a corporation of Delaware Filed Sept. 8, 1966, Ser. No. 577,865
Int. Cl. H04b *1/16*
U.S. Cl. 325—420 4 Claims

ABSTRACT OF THE DISCLOSURE

A control circuit which, when supplied with two alternating input signals of adjacent frequencies by a mixer having a local oscillator coupled thereto, one such signal being amplitude-modulated and the other being amplitude-constant (e.g. frequency modulated), is responsive only to the amplitude-modulated input signal to develop a control signal the value of which is dependent on the frequency of the amplitude-modulated input signal. This control signal is supplied to a signal-responsive variable capacitor arranged to tune the local oscillator, and is effective to change the capacitance of that capacitor, and hence the frequency of the local-oscillator output signal, until the frequency of the amplitude-modulated input signal supplied by the mixer is substantially equal to a selected value. A voltage indicator coupled to the variable capacitor indicates the presence of any amplitude-modulated input signal having a frequency within the passband of the control circuit, but gives no indication in response to an amplitude-constant input signal. The control circuit is particularly useful in a television receiver employing an intercarrier sound system, to provide automatic frequency control of the local oscillator of the receiver selectively in response to the IF picture carrier.

Tuning indicator systems for AM and FM radio receivers may be relatively simple because the broadcast signal contains only a single carrier. The particular signal desired is detected by deriving a control voltage proportional to the amplitude of the received signal at the center of the receiver passband and utilizing the maximum amplitude of this control voltage to indicate proper tuning.

Early television receivers used separate intermediate frequency channels for the audio and video carriers. These receivers separated the audio and video signals in the early IF stages of the receiver. The early separation permitted conventional tuning indicators to be used.

In the majority of present day receivers, common IF amplifier and detector stages are used for both the audio and video signals. This technique, known as intercarrier sound reception, centers the audio carrier around the fixed frequency difference or displacement between the audio and video signals and hence does not depend upon an extemely stable local oscillator for satisfactory sound reception. In standard television broadcasting systems, the intermediate frequency bandwidth is standardized at 6 mHz. By proper tuning of the local oscillator, the intermediate frequency signal resulting from heterodyning the incoming fixed frequency radio frequency signal with the variable local oscillator signal is moved up and down the frequency scale until the audio and video carriers are properly positioned within the 6 mHz. intermediate frequency passband. When intercarrier sound reception is used, it is difficult to derive a control voltage which is capable of distinguishing between the video and audio carriers, both of which are present in the IF stages, and hence difficult to determine when the audio and video carriers are properly positioned within the intermediate frequency passband. The mere derivation of a control voltage from the IF amplifier cannot be relied upon as a tuning reference because the control voltage may be due to the audio carrier being in the position normally occupied by the video carrier.

Prior art systems have attempted to determine when the control voltage is actually due to the video carrier. One prior art system contains means for identifying the intended channel frequency of the carrier, means for detecting a characteristic modulation of the carrier to be identified, and means for using the characteristic modulation as a gate for the identified signal in an amplifying device. Generally, the horizontal synchronization modulation of the video carrier is used as the characteristic modulation of the carrier. In another prior art system, the input signal of the desired frequency is used to generate a harmonic of that frequency, corresponding to the horizontal synchronization frequency, and the harmonic is used to energize mechanical driving means for proper tuning to the video carrier.

Since the prior art tuning methods require detection of the horizontal synchronization frequency, they require complicated circuitry to achieve their desired results. Furthermore, the incorporation of mechanical driving means in a tuning system makes the system more prone to failure.

This invention, therefore, has for an object an improved tuning system for carrier identification in a multicarrier signal.

It is another object of this invention to provide a system which can distinguish between the audio and video carriers in a television signal without the detection of characteristic periodic modulations of the carrier.

A further object of the present invention is to provide a system for automatically tuning the receiver to a selected frequency.

In accordance with the present invention, means are provided for generating an indicating signal when the input signal is an amplitude modulated carrier and additional means are provided for preventing the generation of a indicating signal when the input signal is a signal of constant amplitude. In an exemplary embodiment of the present invention, an intermediate frequency amplifier is biased to conduct for modulated and unmodulated signal inputs. Since the intermediate frequency audio signal in television transmission is a constant amplitude frequency modulated signal, the output of the amplifier will have a constant amplitude for an audio input signal. If the signal input is amplitude modulated, i.e. the intermediate frequency video signal in television transmission, the output of the amplifier will vary in amplitude according to the amplitude modulation of the video input signal. By providing means in the amplifier output circuitry for blocking a constant amplitude output, the circuit will have an output only for an amplitude modulated input signal to the amplifier and hence will be able to detect when the input signal is the video signal. The bandwidth of the input circuit to the amplifier is sufficiently narrow to prevent both the video carrier and the audio carrier being supplied to the amplifier at the same time.

Another aspect of the present invention is the provision of means for indicating that the tuner is tuned to produce the selected intermediate frequency. In present day U.S. television receivers the intermediate frequency is generally chosen to place the video carrier at about 45.75 mHz. The indication is provided by having two tuned circuits resonant at frequencies slightly above and below the selected intermediate frequency of the video carrier. The tuned circuits are connected by circuitry, which may comprise a system for identifying a particular carrier in a multi-carrier signal channel, to a variable-capacitance diode or the like. The diode may be used to give a visual tuning indication and/or automatic frequency control.

In a preferred embodiment of the present invention, means are provided for detecting the video carrier in an intercarrier sound television receiver by deriving a variable amplitude output if the system is tuned to the video carrier, and additional means are provided for indicating when the receiver is tuned to produce the selected intermediate frequency of the video carrier.

The invention will be more fully understood when read in conjunction with the following specification and accompanying drawings wherein.

Figure 1:
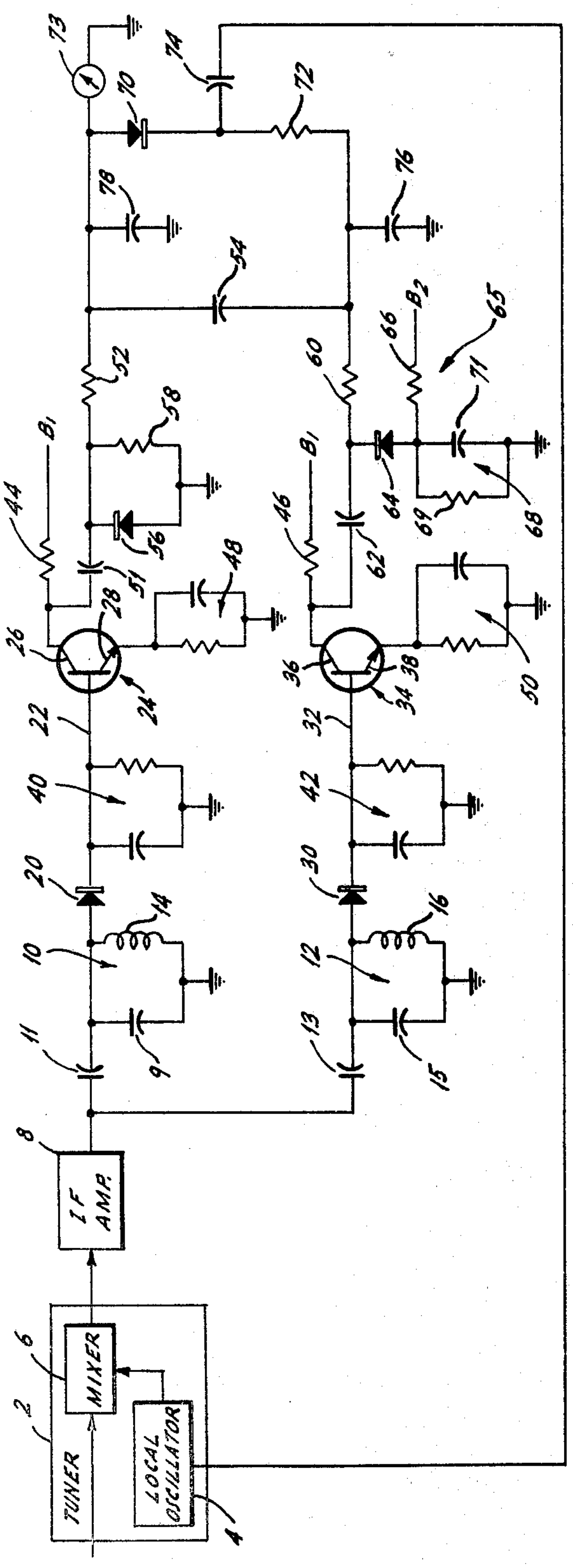
FIGURE 1 is a schematic diagram of the system in accordance with an embodiment of the present invention.

Referring to FIGURE 1, a television signal is supplied to a tuner system 2. Tuner 2 includes a local oscillator 4 for generating a heterodyning signal and a mixer 6. Oscillator 4 includes variable tuning elements (not shown) coupled to mixer 6. Mixer 6 heterodynes the television signal with the local oscillator signal to produce an intermediate frequency signal. The intermediate frequency signal is supplied to an intermediate frequency amplifier 8.

The output of the intermediate frequency amplifier 8 is connected through capacitor 11 to the ungrounded terminal of a first tuned circuit 10 and through capacitor 13 to the ungrounded terminal of a second tuned circuit 12. The first tuned circuit 10 comprises parallel connected capacitor 9 and inductor 14 and is tuned to resonate at a frequency slightly above the intermediate frequency of the video carrier. The second tuned circuit 12 comprises parallel connected capacitor 15 and inductor 16 and is tuned to resonate at a frequency slightly below the intermediate frequency of the video carrier.

Tuned circuit 10 is connected through a diode 20 to the control electrode 22 of an N-P-N transistor 24. Tuned circuit 12 is likewise connected through a diode 30 to the control electrode 32 of a N-P-N transistor 34. The respective control electrodes 22 and 32 of the transistors 24 and 34 are also connected through identical networks 40 and 42, respectively, to ground. Networks 40 and 42 comprise a resistor and a capacitor connected in parallel.

Diodes 20 and 30 are poled to conduct when the potential across the tuned circuits 10 and 12, respectively, exceeds the potential at the control electrodes 22 and 32, respectively, by at least the forward blocking voltage of the diodes. If it is desirable to use P-N-P transistors as the transistors 24 and 34, the polarity of the diodes 20 and 30 would be reversed.

A source of positive bias $B_1$ is connected through a load resistor 44 to the collector electrode 26 of transistor 24 and through a load resistor 46 to the collector electrode 36 of transistor 34. The emitters 28 and 38 of transistors 24 and 34, respectively, are connected through identical resistance-capacitance networks 48 and 50, respectively, to ground.

The collector electrode 26 of transistor 24 is connected through a series circuit comprising a capacitor 51 and a resistor 52 to one side of a capacitor 54. The other side of the capacitor 54 is connected through a series circuit comprising a resistor 60 and a capacitor 62 to the collector electrode 36 of transistor 34. The junction of capacitor 51 and resistor 52 is connected through parallel connected resistor 58 and diode 56 to ground. The anode of diode 56 is at ground potential.

The junction of resistor 60 and capacitor 62 is connected through a diode 64 to a voltage divider network 65. Voltage divider network 65 comprises serially connected resistor 66 and network 68. Network 68 comprises a resistor 69 and a capacitor 71 connected in parallel. The series circuit is connected across a bias source $B_2$, and the junction of resistor 66 and network 68 is connected to the anode of diode 64.

A series circuit comprising a diode 70 and a resistor 72 is connected across the capacitor 54. Capacitors 76 and 78, which may be feedthrough capacitors, are provided around the leads connecting the series circuit to capacitor 54. The cathode of diode 70 is connected to resistor 72 and coupled through a capacitor 74 to the tuning elements of the local oscillator 4.

In the operation of the system, the voltage divider network 65 develops a back bias across the diode 70 when there is no input signal from the intermediate frequency amplifier 8. Back biased diode 70 acts as a voltage variable capacitor which affects the tuning, and hence the output frequency, of local oscillator 4.

If the input from the intermediate frequency amplifier is unmodulated in amplitude, the outputs of transistors 24 and 34 have only D-C voltage components which are blocked by capacitors 51 and 62. Therefore, a signal unmodulated in amplitude does not change the voltage level at the anode or cathode of the diode 70.

If an amplitude modulated signal having the selected intermediate frequency of 45.75 mHz. is supplied by the intermediate frequency amplifier 8, the voltages generated at the output electrodes 26 and 36 of transistors 24 and 34, respectively, are equal and contain D-C and A-C voltage components. The capacitors 51 and 62 block the respective D-C voltage components and the A-C voltage components produce equal charges across capacitors 76 and 78. Charging of capacitors 76 and 78 is due to rectification of the transistor output signals by the rectifiers 56 and 64, respectively. The charges on capacitors 76 and 78 change the voltage levels at the anode and cathode of the diode 70 but do not change the voltage between the anode and cathode. Since the voltage between the anode and cathode does not change, the capacitance of diode 70 does not change. Therefore the tuning of local oscillator 4 does not change.

Figure 2:
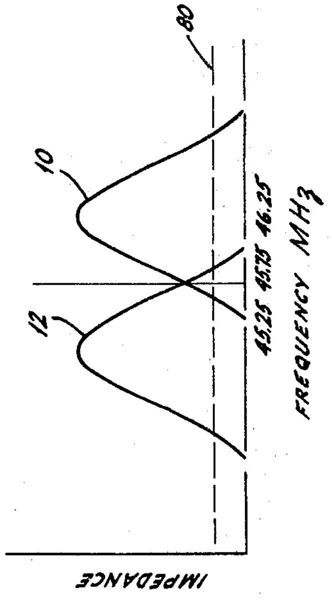
FIGURE 2 is a diagram showing the resonance characteristics of the tuned circuits of the system of the present invention; and, FIGURE 3 is a graph showing the transmission characteristics of a standard television channel.
Figure 3:
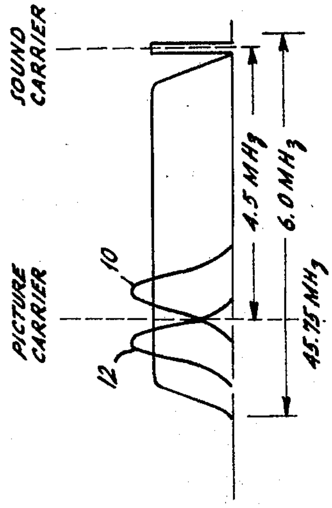

If the output signal from IF amplifier 8 is an amplitude modulated signal (such as the video carrier) having a frequency which varies slightly from the selected intermediate frequency of 45.75 mHz., the circuit of FIG. 1 operates to change the frequency of this output signal to 45.75 mHz. The manner in which the circuit of FIG. 1 changes the frequency can best be understood by reference to FIGURE 2 which is an idealized graph showing the impedance of tuned circuits 10 and 12 at different frequencies and to FIG. 3 which is a graph showing the idealized transmission characteristics for a standard television channel with the impedance characteristics of tuned circuits 10 and 12 superimposed thereon. In FIG. 3 the sound carrier is spaced 4.5 mHz. from the picture carrier.

If the selected intermediate frequency is 45.75 mHz. the resonant frequencies of tuned circuits 10 and 12 can be 46.25 mHz. and 45.25 mHz., respectively. The impedance of each tuned circuit is highest at its resonant frequency and the impedance decreases rapidly as the frequency of the signal differs from its resonant frequency. The line 80 indicates the value of the impedance of the tuned circuits 10 and 12 below which the transistors 24 and 34 will be biased to non-conduction. The particular value of line 80 will depend upon the values of the resistors 44 and 46, the networks 48 and 50, and the value of the bias source $B_1$. From FIGURE 2 it can be seen that for frequencies in the vicinity of the resonant frequency of one tuned circuit, the other tuned circuit will have insufficient output to cause its associated transistor to conduct.

If the video carrier signal from the intermediate frequency amplifier 8 is not at the selected intermediate frequency of 45.75, the voltage generated at the output electrodes 26 and 36 of transistors 24 and 34, respectively, are unequal and cause the voltage differential across diode 70 to assume a value other than that established by voltage divider network 65. The change in voltage differential across diode 70 changes its capacitance. Due to the diode 70 being coupled to the tuning elements (not shown) of local oscillator 4, the local oscillator frequency changes in a direction tending to place the video carrier at the selected frequency of 45.75 mHz. Therefore, the tuner output signal frequency is maintained automatically at the selected intermediate frequency.

The resistors 52 and 60 along with the capacitor 54 form a time delay circuit to prevent instantaneous fluctuations in input voltage, i.e. noise peaks, from appearing across diode 70. The capacitor 74 functions as a D-C blocking capacitor and the capacitors 76 and 78 function as radio frequency bypass capacitors. The resistor 72 and the capacitors 74, 76, and 78 provides isolation between the D-C operated tuning selector circuit and the A-C operated tuner 2.

As described above, the voltage at the anode or cathode or both of diode 70 will change only if an amplitude modulated signal having a frequency falling within the passband of one or both of the circuits 10 and 12 is supplied by IF amplifier 8. Therefore, a voltage sensitive device such as meter 73 connected between either side of diode 70 and a fixed reference point will indicate when an amplitude modulated carrier signal is being received. Since, as mentioned above, the sound carrier is unmodulated in amplitude, the magnitude of the voltage developed at the anode of diode 70 will not change when the local oscillator of a television receiver is mistuned so that the sound carrier falls at an intermediate frequency of approximately 45.75 mHz. However, the video carrier is amplitude modulated. Therefore, the magnitude of the voltage developed at the anode of the diode 70 will change when the local oscillator of the television receiver is correctly tuned so that the picture carrier falls at approximately 45.75 mHz.

If the identification of the sound carrier is not a problem, the transistors 24 and 34 can be eliminated and the diodes 20 and 30 will control the voltage differential across diode 70 and hence the tuner output signal frequency. Likewise, if it is not desirable to automatically control the tuner output signal frequency, the lower half of the circuit of FIG. 1 can be eliminated.

While the invention has been described with reference to certain preferred embodiments thereof, it will be apparent that various modifications and other embodiments thereof will occur to those skilled in the art within the scope of the invention. Accordingly I desire the scope of my invention to be limited only by the appended claims.

What I claim is:

1. In a tuning system, a tuner, a variable capacitance device, a first cascade connected signal channel comprising a first tuned circuit, a first amplifier, first rectifier means, and a first device for blocking a signal of constant amplitude, a second cascade connected signal channel comprising a second tuned circuit, a second amplier, second rectifier means, and a second device for blocking a signal of constant amplitude, said first cascade connected signal channel coupling said tuner to a first side of said device, said second cascade connected signal channel coupling said tuner to a second side of said device, and additional means for coupling at least one of said sides of said device to said tuner.

2. In a system for automatically maintaining at a selected frequency the frequency of an output signal of a mixer supplied with an input signal and also supplied with an oscillatory signal by a local oscillator, capacitive means coupled to said local oscillator for changing the frequency of said oscillatory signal in response to changes in the capacitance of said means, said means comprising first and second terminals and arranged to undergo variations in its capacitance in response to variations in a potential difference applied between said two terminals, a first circuit supplied with and responsive to said output signal of said mixer to produce a first control voltage and to supply it to said first terminal of said capacitive means, a second circuit supplied with and responsive to said output signal of said mixer to produce a second control voltage and to supply it to said second terminal of said capacitive means, each of said first and second circuits including a tuned circuit supplied with said output signal of said mixer, and a detector circuit supplied with the output signal of said tuned circuit and coupled to the associated terminal of said capacitive means, said tuned circuit of said first circuit being resonant at a fixed frequency slightly above said selected frequency, said tuned circuit of said second circuit being resonant at a fixed frequency slightly below said selected frequency, and said two fixed frequencies being respectively equidistant from said selected frequency, so that the potential difference produced between said two terminals of said capacitive means by said first and second control voltages changes only when said frequency of said output signal of said mixer deviates from said selected frequency.

3. A system according to claim 2 wherein said second circuit includes means for establishing a reference potential at said second terminal of said capacitive means.

4. A system according to claim 3 wherein said first circuit further includes a capacitor connected in the signal path between said detector circuit of said first circuit and said first terminal of said capacitive means for preventing a constant-amplitude signal supplied thereto by the detector circuit of the first circuit from changing the potential difference between said terminals of said capacitive means, and said second circuit further includes a capacitor connected in the signal path between said detector circuit of said second circuit and said second terminal of said capacitive means for preventing a constant-amplitude signal supplied thereto by the detector circuit of said second circuit from changing the potential difference between said terminals of said capacitive means.

References Cited

UNITED STATES PATENTS

| | | | |
|---|---|---|---|
| 3,110,004 | 11/1963 | Pope | 334—15 |
| 3,150,322 | 9/1964 | Van Saun | 325—420 |
| 3,345,464 | 10/1967 | Gillett | 179—15 |
| 3,382,441 | 5/1968 | Hunter | 325—422 |

KATHLEEN H. CLAFFY, Primary Examiner

C. JIRAUCH, Assistant Examiner

U.S. Cl. X.R.

325—422